Oct. 29, 1946.   G. C. SZIKLAI   2,410,369
POWER SUPPLY CIRCUITS
Filed Sept. 1, 1942
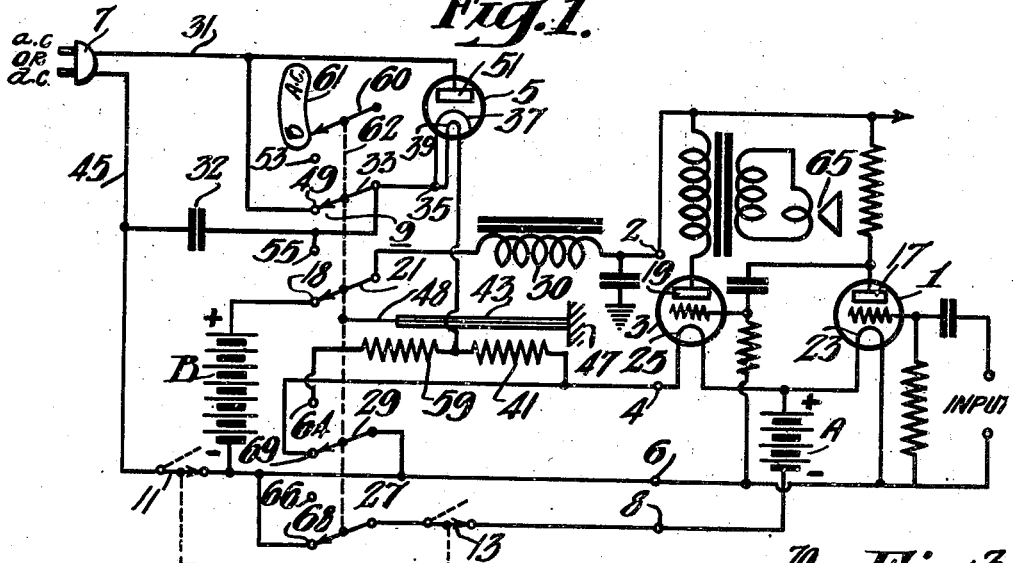
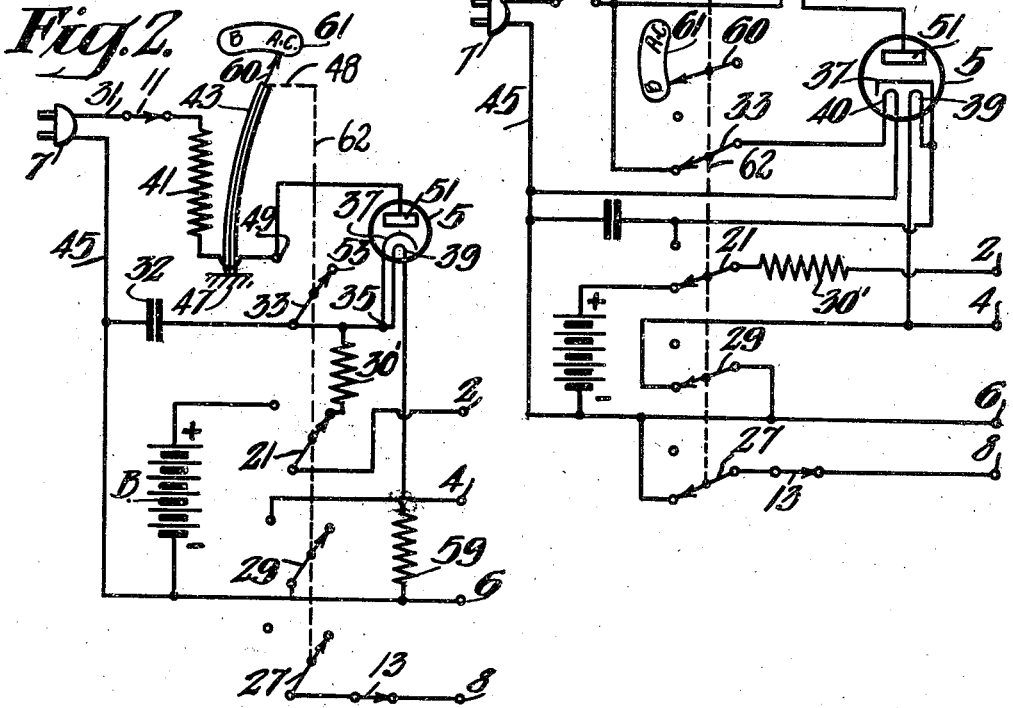
Inventor
George C. Sziklai
By
C. D. Tuska
Attorney Patented Oct. 29, 1946

2,410,369

UNITED STATES PATENT OFFICE 2,410,369

POWER SUPPLY CIRCUITS

George C. Sziklai, Bloomington, Ind., assignor to Radio Corporation of America, a corporation of Delaware Application September 1, 1942, Serial No. 456,865

18 Claims. (Cl. 315—96)

This invention relates to power supply circuits in thermionic amplifier apparatus, more particularly in radio receiving sets energized by alternating or direct current power mains or from a battery power source; in other words, universal power supply circuits.

An object of this invention is to provide an improved and simplified arrangement for energizing radio apparatus from alternating or direct current power supply means or from a battery supply source.

A further object of this invention is to improve the efficiency of operation of universal power supply circuits for radio apparatus.

A more specific object of this invention is to eliminate the usual voltage dropping resistor employed in universal power supply circuits in radio apparatus for reducing the voltage supplied to the cathode circuits of the apparatus.

A still further object of this invention is to prolong the life of rectifier tubes and other apparatus in the power supply circuits of radio receivers.

In accordance with this invention, there is provided a universal power supply for radio apparatus wherein the apparatus is arranged to operate substantially immediately upon closing of the power switch, as from an auxiliary battery supply, and wherein the apparatus is automatically caused to operate from a power main as soon as it has been conditioned so to operate, and automatically to fall back upon such battery operation in case of failure of the power supply mains or failure of elements, such as the rectifier, of the power circuit.

These, as well as other objects, will be fully apparent from the following detailed description of the specification when taken in connection with the attached drawing.

In the accompanying drawing, Fig. 1 is a diagrammatic illustration of the circuit arrangements of a preferred form of the invention; Fig. 2 is a circuit diagram illustrating a modification of the invention; and Fig. 3 is a circuit diagram of another modification of the invention.

Heretofore, in radio receiving apparatus operated from either alternating or direct current, it has been necessary to employ a voltage dropping resistor between the side of the line to which the power rectifier is connected and the serially connected filaments or cathode heaters. By way of example, see patent to Wuerfel 1,900,629, Fig. 2. This arrangement has reduced the efficiency of operation because of the power dissipated in the dropping resistor. A further disadvantage lies in the fact that the resulting heat caused by this power loss has been a source of trouble. For example, it has shortened the life of the electrolytic condensers in the receiver and has, in general, added to the problem of getting rid of heat generated in the apparatus. One expedient has been to place this voltage dropping resistor in the power cord lead to the receiver, so that the heat has been dissipated into the air outside of the apparatus. See patent to Mason et al. 1,978,053.

In accordance with this invention, the voltage of the current supply to the cathode circuit of the radio apparatus is reduced to the desired value by resistance means which performs other useful functions than merely dropping the voltage. Referring to Fig. 1 of the drawing, there is shown a first audio amplifier tube 1 and a power amplifier tube 3 of a radio receiver, arranged to be energized by A.-C. or D.-C. power supply mains or from battery sources A and B. For the purpose of rectifying the current from an A.-C. power source, a thermionic rectifier 5, which may be of the evacuated electron emission type, or gas filled or mercury vapor type, is connected between the circuits of the amplifier tubes and one side of the power source to which it is connected through a plug 7. There is provided a multiple pole ganged switch 9 for switching the thermionic apparatus from battery supply operation over to A.-C. or D.-C. operation from the power mains, and vice versa, after the power mains circuit and the A battery circuits have been closed by means of switches 11 and 13, preferably arranged to be simultaneously operated as shown by dash line 15.

The thermostatic ganged switch arrangement 9 in the position shown causes direct current to be supplied from battery B to the anodes 17 and 19 of tubes 1 and 3, respectively, through contact 18 and switch 21, and causes cathode filament current to be supplied in parallel to the filamentary cathodes 23 and 25 of the same tubes, respectively, through switch 27 to contact 68, in cooperation with another switch 29 and contact 69, which switches effect the parallel operation of the filamentary cathodes.

Assuming that plug 7 is inserted in the power mains, either A.-C. or D.-C. current is caused to flow through power lead 31 through switch 33, in the position shown, to terminal 35, the junction between rectifier cathode 37 and its internal heating resistor element 39. From this point the current flows through the heating element 39 serially through a heating winding 41 of a bimetal element 43, through switch 29 and back to the other side of the power mains by way of lead 45. As shown, the radio apparatus is operated by batteries A and B while the cathode 37 of the rectifier tube is being heated by current from the power mains. After the cathode 37 has been heated sufficiently to become thermionically active for normal operation of the rectifier, the bimetal element 43 has also become heated, and after a desired time interval this bends in a clockwise direction about its base, at 47, and causes switches 27, 29, 21 and 33 to move over to the other contacts shown at 53, 55, 64 and 66. It is preferred that this thermionic switch be of the snap action type, so that the movement of the contacts for both closing and opening is rapid and positive in action, although the particular details of construction form no part of the present invention, being well known in the art.

With switch 33 in the position shown, on contact 49, the rectifier anode 51 is short-circuited directly to its cathode 37 so that there is no difference of potential between the two electrodes. In other words, rectifier tube 5 is by-passed and the heater 39 is connected ahead of the tube directly to one side 31 of the mains for starting the tube. However, with switch 33 on contact 53, the cathode 37 is disconnected from this short circuit and is in normal operating series relation with respect to anode 51 and the power supply source, and with the anode circuit load of tubes 1 and 3 by way of switch 21 which is now contacting terminal 55. Although the voltage reducing means or heater element 39 has been disconnected from the direct connection to the side of the power line at 31, the rectifier cathode 37 continues to operate by reason of the fact that rectified current, passing normally through the rectifier, flows from point 35 through the heater 39, through the relay resistance winding 41, and thence through the filamentary cathodes 25 and 23 of tubes 3 and 1, respectively, back to the other side of the power line via lead 45. In this connection, it is noted that switches 29 and 27 are now open circuited for the filaments 25 and 23, which are thereby connected in series, with the battery A removed from circuit. It will be observed that in the above operation the cathode 37 of rectifier 5 becomes thermionically active before the power voltage is applied between the anode 51 and the cathode 37. For well known reasons this lengthens the life of a rectifier tube and is quite necessary in the case of a mercury type rectifier tube. While not the prime object of the invention, this is a desirable advantage that occurs in connection with the present invention. In the event that the power from the mains should fail, the current through heaters 39 and 41 stops and the bimetal element returns to its first or cold position as shown, and the radio apparatus is again connected to battery operation. Upon restoration of the voltage in the power mains, the set is again switched over to power main operation in the manner above outlined, thereby avoiding any discontinuity in service.

The rectifier tube 5 which was used in connection with the present invention was known as the RCA type 117Z6, but any rectifier tube can be used so long as it has a higher plate current than heater current rating. In this particular tube the resistance of the heater is around 1400 ohms as compared with 2500 ohms resistance which would normally be used for a filament voltage dropping resistor. By placing the heating winding 41 of the bimetallic relay in series with heater 39, this value of resistance is substantially increased and can be made to give the desired 2500 ohms total resistance drop, assuming a filament current of 10 milli-amperes. To increase the heating current in element 39, a bleeder resistor 59 has been connected from the heater to terminal 64 of switch 29 so that, when in the power mains position of switch 29, additional current to that drawn by filaments 25 and 23 flows in heater 39. This additional current in 59 is also used to help to heat the thermostatic relay, in case additional heat is desired to hold the switch in the power mains position, there being less current in 41 when connected in series with the filaments 25 and 23 than when across the power line with heater 39. However, it ordinarily takes less current to hold the relay than it does to initially operate it.

In an earlier arrangement, the bimetallic relay was connected in series in the lead 31, as shown in Fig. 2. It was found that the rectifier heater current was approximately 50% greater than that required by the amplifier tubes, due to the insufficient amount of resistance in heater element 39, and it was therefore found necessary to use a shunting resistor 59 to divert current from the filaments of the amplifier tubes and to draw the proper amount of current for operating heater 39. While it would be more efficient to have a rectifier tube with a heater employing the same heating current as the amplifier tube filaments, thereby avoiding the necessity of using resistor 59 in Fig. 2, this disadvantage is partially overcome by connecting the heater of the thermostatic relay in series with the rectifier cathode heater, as shown at 41 in Fig. 1. A disadvantage of connecting the thermostatic element 41 as shown in Fig. 2 is that there is a loss of voltage ahead of the rectifier and less voltage available for the amplifier. The circuit of Fig. 1 overcomes this disadvantage. In Fig. 2, and also in Fig. 3, the amplifier circuit is not shown, but is the same as in Fig. 1, connected to terminals 2, 4, 6 and 8.

When plug 7 is connected to D.-C. mains the same operation takes place as above outlined, so long as the correct polarity is obtained, that is, when lead 31 is connected to the positive side of the line. To inform the operator whether the set is operating on power mains or battery, there has been connected to the switch an indicator 60 and 61, the moving element 60 of which is ganged with the switch arms as shown by the dash line 62, operatively connected to the thermostatic element at 48. In case of failure of the rectifier tube, this indicator will give a warning by showing "B" operation at all times. Amplifier tube 1 has its grid electrode connected to input terminals as shown and its anode 17 is coupled to the control electrode of tube 3 in the plate circuit of which there is coupled a loudspeaker or other output device 65.

While the above arrangements are intended primarily to operate from power mains, they will readily operate from the batteries A and B by closing switch 13 when the power plug 7 is not plugged into power mains. It can therefore be considered as a battery operated portable receiver which can be operated from power mains by simply plugging into the same and without the necessity of throwing any additional switches or making any special connections. If it is operating in this manner from batteries, and the plug 7 is inserted into power mains, the receiving set will automatically be changed over to power line operation in the manner above described. In some circuits heretofore used, it has been necessary to use a complicated system of switching to convert over to battery operation from power line operation, although in an improved arrangement it has been customary to remove the power plug from the mains receptacle and plug it into a receptacle on the receiver chassis as part of the switching operation, as disclosed, for example, in Wuerfel 1,975,441.

Various modifications will occur to those skilled in the art. By way of example, I have shown in Fig. 3 a modification wherein other preheating means, such as an auxiliary heater element 40, is provided within the cathode 37 solely for the purpose of initiating thermionic emission from the cathode. Heater 39, corresponding to that in Fig. 1, is here arranged to be heated only by rectified current after the rectifier is caused to operate, and subsequently is connected in series with the cathodes of the amplifier tube, as shown in Fig. 1. One terminal of the auxiliary heater is connected to one side of the power line at 45, while the other terminal is connected to the other side of the line at 31, through switch 33, in the position shown for preheating. As soon as the cathode 37 reaches normal operating condition, current will flow from the line through rectifier 5, through heater element 39, and through switch 29 back to the other side of the line. In this respect the circuit of Fig. 3 differs from the others, and by way of further modification I have shown an electromagnetic relay 70 in circuit with the anode of the rectifier. As soon as the rectified current through 70 reaches a desired amount, the armature 71 is actuated and the switches 33, 21, 29 and 27 are thrown, as before, to the other contacts for operation of the amplifier from the power mains. When the switch is thrown as described, the circuit to the auxiliary heater is broken by switch 33. In this arrangement, I have shown no bleeder resistor shunting the filament circuit of the amplifier tubes, since here I prefer to provide a heater 39 operating on the same amount of current as the filaments of the amplifiers tubes, and having the desired voltage drop for operating the amplifier tubes. Various other modifications might be made without departing from the spirit of my invention. For example, the batteries A and B can be dispensed with, and my invention still possesses the main advantage of elimination of the voltage dropping resistor, above described. While I have shown filamentary types of tubes for the amplifier tubes, mainly for the purpose of quick heating and operation on batteries, the same could be used with power line operation only and the auxiliary heater can be designed to heat the rectifier cathode quickly.

While I have shown the heater or voltage reducing element in the rectifier tube as being supplied with rectified current from its own rectifier electrodes, it is obvious that this element may be supplied with rectified current by other means. In other words, while the voltage reducing element is connected to one side of the main through the rectifier, it can be connected directly thereto, as it is in the preheating position, with another rectifying means in circuit to cause it to supply rectified heating current.

From the foregoing disclosure, it will be apparent that the present invention provides not only a more efficient power circuit than heretofore known, but also provides a highly simplified and foolproof arrangement that can readily be used with either batteries or A. C./D. C. power operation with the exercise of no conscious effort on the part of the user. Those skilled in the art will readily appreciate that the principles involved in the construction and operation may be embodied in various forms of practical circuits without departing from the spirit and scope of this invention, and I do not, therefore, desire to be limited to the disclosure as given for purposes of illustration, but rather to the scope of the appended claims.

What I claim as my invention is:

1. In thermionic apparatus, an amplifier including a plurality of vacuum tubes each having a cathode and an anode, a thermionic rectifier having an anode and a cathode, heating means for energizing said rectifier cathode, a power supply circuit including said rectifier for energizing said amplifier cathodes and anodes from alternating or direct current power mains, switch means for initially connecting at least a portion of said heating means across said means to operatively heat said rectifier cathode, and means responsive to current flow in said supply circuit for subsequently disconnecting said portion and connecting at least a portion of said heating means in series circuit relation with said amplifier cathodes and said rectifier for deriving direct current from said mains.

2. In thermionic apparatus, a source of alternating current, a power supply circuit comprising a rectifier tube connected thereto, said tube having an anode and a cathode including an element for heating said cathode, a direct current thermionic load circuit, means for connecting said element across said alternating current source to cause thermionic emission from said cathode while maintaining substantially no difference of potential between said cathode and said anode, and time delay means responsive to current flow in said supply circuit for establishing subsequently a difference of potential between said anode and said cathode while connecting said element in series circuit relation with said load circuit and said rectifier, whereby rectified alternating current is caused to flow through said element and said load circuit.

3. In combination with radio apparatus, a main source of power supply for said apparatus, a thermionic amplifier included in said apparatus and having an anode and a cathode, a power supply circuit comprising a rectifier tube connected between said source and said amplifier for supplying direct current at low voltage to said amplifier cathode and direct current at relatively high voltage to said amplifier anode, said rectifier tube having anode and cathode electrodes and a heating element, means for connecting one terminal of said element to a point in said supply circuit ahead of said rectifier for receiving heating current from said mains and for subsequently disconnecting said terminal from said point and connecting at least a portion of said element in series relation with said rectifier electrodes for supplying direct current serially through said element portion to said amplifier cathode.

4. In combination with radio apparatus including a plurality of thermionic amplifier tubes in cascade, each of said amplifier tubes including a cathode and an anode, a power supply circuit for energizing said amplifier cathodes with rectified current and said amplifier anodes with operating direct current potentials from an alternating current source of power, a rectifier tube connected between said source and said amplifiers, said rectifier tube having an anode connected to one side of said source and a cathode including a heater element with at least two terminals one terminal being connected directly to said cathode, means for substantially short-circuiting said rectifier cathode to said rectifier anode and for connecting another terminal of said heater element to the other side of said source to operatively preheat said rectifier cathode, time delay means operatively connected with said heater element and said amplifier cathodes for removing said short circuit after said rectifier cathode has become operative in response to current flow in said supply circuit and for connecting said cathode directly in circuit with said amplifier anodes to supply said operating potentials thereto, said time delay means also disconnecting said heating element from said other side of said source and for connecting said element in series relation with said amplifier cathodes and said rectifier, whereby said rectified current is supplied to said cathodes.

5. In thermionic apparatus, an amplifier including a plurality of vacuum tubes each having a cathode and an anode, a thermionic rectifier tube having an anode and a cathode with a heater element, power supply circuits for energizing said amplifier cathodes and anodes from alternating or direct current power mains or from a battery source, switch means for initially connecting said heater element across said mains to operatively heat said rectifier cathode and for connecting said amplifier anodes and cathodes to a battery source of supply current, and time delay means responsive to current flow in one of said circuits for subsequently disconnecting said amplifier cathodes from said battery source and for connecting same in series with said heater element while disconnecting said heater element from said mains and connecting said element in series relation with said rectifier for supplying rectified current to heat said cathodes.

6. In thermionic apparatus, a source of alternating current, a rectifier tube connected thereto, said tube having an anode and a cathode including an element for heating said cathode, a direct current thermionic load circuit, a battery source of current for said load circuit, switch means connecting said load circuit to said battery source for energizing said circuit, switch means for initially heating said element from said alternating current source to cause said cathode to become thermionically active, and time delay means responsive to said heating current for disconnecting said load circuit from said battery source and connecting said circuit to said rectifier cathode and for connecting said rectifier in series between said source and said load circuit, said element being connected in series between said cathode and said load circuit whereby rectified direct current is supplied to said load circuit through said element for heating same and effecting a substantial drop in potential between said cathode and said load circuit.

7. In thermionic apparatus, a thermionic load circuit, a power supply circuit for supplying operating current from alternating current mains to said apparatus, a rectifier tube connected in said supply circuit and having therein an anode, a cathode and a heating element, means for initially rendering said rectifier operative, said element being connected in series with said rectifier in said supply circuit for maintaining said rectifier operative and supplying rectified current at reduced voltage to at least a section of said load circuit.

8. The invention as set forth in claim 7 characterized by means for connecting said element initially across said source to preheat said cathode and cause same to become thermionically active, and time delay means responsive to the flow of load current for disconnecting said element from said source and connecting said element in series between said cathode and said load circuit.

9. The invention as set forth in claim 7 characterized in that said load circuit includes high and low voltage operating sections, and said cathode is connected to said high voltage section and said heater element is connected to said low voltage section.

10. The invention as set forth in claim 7 characterized in that said cathode is initially started by connecting at least a portion of said heating element across said mains and subsequently disconnecting said portion from said mains.

11. In radio apparatus, a multi-stage vacuum tube amplifier, each tube thereof having a filamentary cathode and an anode, a thermionic rectifier tube having an anode cathode and heating structure, supply circuits including said rectifier for energizing said cathodes and said amplifier anodes with rectified current from an alternating current source, switch means for initially connecting said rectifier cathode heating structure to said source to initiate thermionic emission therefrom and for subsequently connecting said rectifier cathode heating structure in series circuit relation with said amplifier cathodes and said rectifier for heating said cathodes by rectified current.

12. In thermionic apparatus, an amplifier including an anode and a filamentary cathode, a rectifier tube having an anode and a cathode with a heating element, a power supply circuit including said rectifier tube for energizing said amplifier from an alternating or direct current power mains, said rectifier anode being connected to one side of said mains and said rectifier cathode being connected in direct current relation with said amplifier anode for supplying high voltage operating potential thereto, said heating element having one terminal connected to said rectifier cathode and another terminal connected to one terminal of said amplifier cathode in series relation therewith for supplying low voltage rectified current thereto, the other terminal of said amplifier cathode being connected to the other side of said mains.

13. In thermionic apparatus, a thermionic amplifier having anode and directly heated cathode electrodes, a source of alternating current, a rectifier connected between said source and said amplifier anode electrode for supplying rectified current thereto, resistance means connected in series between said source and said amplifier cathode electrode for supplying heating current thereto at a voltage substantially lower than that supplied to said amplifier anode electrode, and means whereby said resistance means is connected with said rectifier for rendering said rectifier operative and subsequently maintaining said rectifier in operative condition.

14. The invention as set forth in claim 7 wherein an auxiliary source of power is provided for energizing said load circuit while said rectifier is in an inoperative condition.

15. The invention as set forth in claim 13 wherein an auxiliary source of power is provided for energizing said amplifier electrodes while said rectifier is in an inoperative condition.

16. The invention as set forth in claim 12 wherein means is provided for preheating said rectifier cathode to initiate thermionic emission within said rectifier.

17. The invention as set forth in claim 12 wherein means is provided for preheating said rectifier cathode to initiate thermionic emission therefrom, said means being responsive to current flow of a desired amount through said rectifier for rendering inactive said means.

18. The invention as set forth in claim 12 wherein means separate from said heating element is provided for initiating thermionic emission within said rectifier.

GEORGE C. SZIKLAI.